United States Patent
Wagner et al.

(10) Patent No.: US 12,515,212 B2
(45) Date of Patent: Jan. 6, 2026

(54) PROCESSES FOR PURIFYING POLYETHER POLYOLS USING ION EXCHANGE RESINS

(71) Applicant: Covestro LLC, Pittsburgh, PA (US)

(72) Inventors: Daniel R. Wagner, Pittsburgh, PA (US); Brian L Neal, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 350 days.

(21) Appl. No.: 18/371,808

(22) Filed: Sep. 22, 2023

(65) Prior Publication Data

US 2024/0123438 A1    Apr. 18, 2024

Related U.S. Application Data

(60) Provisional application No. 63/379,175, filed on Oct. 12, 2022.

(51) Int. Cl.

| | |
|---|---|
| *B01J 47/02* | (2017.01) |
| *B01D 3/10* | (2006.01) |
| *B01J 39/12* | (2006.01) |
| *B01J 41/10* | (2006.01) |
| *B01J 47/026* | (2017.01) |
| *C08G 18/48* | (2006.01) |

(52) U.S. Cl.
CPC .............. *B01J 47/026* (2013.01); *B01D 3/10* (2013.01); *B01J 39/12* (2013.01); *B01J 41/10* (2013.01); *C08G 18/48* (2013.01)

(58) Field of Classification Search
CPC . B01J 47/026; B01J 39/12; B01J 41/10; B01J 39/05; B01D 3/10; B01D 15/362; B01D 15/363; C08G 18/48; C08G 65/2609; C08G 65/2648; C08G 65/30; C02F 1/42
See application file for complete search history.

(56) References Cited

U.S. PATENT DOCUMENTS

| | | | |
|---|---|---|---|
| 3,458,436 A | 7/1969 | Martinola et al. | |
| 4,985,551 A * | 1/1991 | Perry | C08G 65/30 536/120 |
| 4,994,627 A | 2/1991 | Cuscurida et al. | |
| 5,254,227 A | 10/1993 | Cawlfield et al. | |
| 5,342,541 A | 8/1994 | Chavez et al. | |
| 5,410,093 A | 4/1995 | Dorai | |
| 5,416,241 A | 5/1995 | Ruszkay | |
| 5,468,840 A | 11/1995 | Tsutsui et al. | |
| 5,516,885 A | 5/1996 | Gorzynski et al. | |
| 5,962,749 A | 10/1999 | Parsons et al. | |
| 6,037,381 A | 3/2000 | Beer et al. | |
| 6,827,858 B2 | 12/2004 | Bader et al. | |
| 6,878,802 B2 | 4/2005 | Ciprian et al. | |
| 9,040,753 B2 | 5/2015 | Chen | |
| 9,040,754 B2 | 5/2015 | Osborne et al. | |
| 9,353,039 B2 | 5/2016 | Den Heeten et al. | |
| 10,131,743 B2 | 11/2018 | Lorenz et al. | |
| 10,544,158 B1 | 1/2020 | Loveday et al. | |
| 2001/0011147 A1 | 8/2001 | Krueger et al. | |
| 2013/0274421 A1 | 10/2013 | Kim et al. | |
| 2014/0018459 A1 | 1/2014 | Shutov et al. | |
| 2015/0158976 A1 | 6/2015 | Dorai et al. | |
| 2019/0106369 A1 | 4/2019 | Schubert et al. | |
| 2021/0130544 A1 | 5/2021 | Wood et al. | |

FOREIGN PATENT DOCUMENTS

CN        102336902 A       2/2012

OTHER PUBLICATIONS

Kirk-Othmer Encyclopedia of Chemical Technology; Fourth Edition; vol. 14;; Imaging Technology to Lanthanides; John Wiley & Sons; pp. 760-770; Ion Exchange.
De Lucas et al; Separation Science and Technology; 30(1); pp. 125-140, Copyright 1995 by Marcel Dekker, Inc.
Ionescu, Mihail; Chemistry and Technology of Polyols for Polyurethanes; Copyright 2005, Rapra Technology Limited, Shawbury, Shrewsbury, Shropshire, SY4, 4NR, UK; p. 132.

\* cited by examiner

*Primary Examiner* — Waqaas Ali
(74) *Attorney, Agent, or Firm* — Donald R. Palladino

(57) ABSTRACT

Processes for purifying polyether polyols via treatment with ion exchange resins. A mixture that includes the polyether polyol and alkali metal ions is passed through a first bed that includes a cation exchange resin comprising carboxylic acid and/or phosphonic acid groups to remove alkali metal ions from the mixture. Thereafter, the product is passed through a second bed comprising an anion exchange resin comprising quaternary ammonium groups and a cation exchange resin comprising carboxylic acid and/or phosphonic acid groups to thereby produce a purified polyether polyol.

20 Claims, No Drawings

PROCESSES FOR PURIFYING POLYETHER POLYOLS USING ION EXCHANGE RESINS

FIELD

The present invention is directed to, among other things, processes for purifying polyether polyols via treatment with ion exchange resins.

BACKGROUND

Polyether polyols are often manufactured using a catalyzed reaction of initiators having active hydrogen atoms with epoxides such as, for example, ethylene oxide and/or propylene oxide. Alkalinity is introduced into the polyether polyols, for example, by using alkaline metal hydroxides as catalysts.

Potassium hydroxide (KOH) and sodium hydroxide (NaOH) are some examples of typical alkaline catalysts used. In general, the metal hydroxide catalyst is added to the starter (usually a hydroxyl group containing compound), and equilibrium between the metal hydroxide and the starter occurs. This equilibrium is as shown in the following equation (using KOH as the alkaline catalyst):

$$KOH + ROH \leftrightarrow H_2O + RO^-K^+$$

Both the hydroxide and the alkoxide can react with epoxides. This is often acceptable for short chain (low molecular weight) polyols, but the reaction of water is undesirable in the preparation of long chain (high molecular weight) polyols. It is, therefore, necessary to force the above equilibrium to the right by removing the water to convert hydroxide to alkoxide. The total amount of alkalinity remains constant and equals the amount of KOH originally added.

Once polymerization of the epoxide(s) is completed, the resulting crude polyether polyol contains alkaline ions from the catalyst that must be removed until a very low level of such alkaline ions remains. Several processes for such removal are known.

One method of removing alkaline ions from a crude polyether polyol is by treatment with an acidic cation exchange resin. In this process, the crude polyether polyol is passed through a porous bed comprising the cation exchange resin, sometimes a copolymer of styrene and divinylbenzene with sulfonic acid groups, whereby an ion exchange occurs between the alkaline ions in the crude polyether polyol and the cation exchange sites on the resin, thereby purifying the polyether polyol. In some industrial processes the crude polyether polyol is also passed through a "mixed" ion exchange bed that includes a strong cation exchange resin that includes sulfonic acid groups and a strong anion exchange resin that includes quaternary ammonium and/or tertiary amine groups. The use of such a "mixed" bed downstream of a cation exchange resin bed can be beneficial for removing any alkali metal ions that "pass through" the upstream cation exchange resin bed and to neutralize acid that may be present in order to produce a polyether polyol having a very low acid value.

Such ion exchange purification processes are, however, not without their disadvantages. Notably, polyether polyol and polyurethane foam producers are under increased pressure to reduce the presence of odor bodies. One such odor body that sometimes gives rise to complaints is 2-Methyl-2-Pentenal ("2M2P"), $C_6H_{10}O$, which can form by acid catalyzed reaction of allyl alcohol to propionaldehyde, which then condenses to 2M2P and water. Purification of long chain, low hydroxyl number polyether polyols via ion exchange, however, has led to formation of 2M2P. These polyols are often used in producing flexible polyurethane foams that are often used in consumer applications, such as foam mattresses and vehicle seating, where the presence of odor bodies is particularly undesirable.

As a result, it would be desirable to provide a method of purifying polyether polyols, such as low (such as less than 56 mg KOH/g) hydroxyl number polyether polyols via an ion exchange process, to produce purified polyether polyols that have low (such as 5 ppm or less) 2M2P content, low (such as no more than 0.1 mg KOH/g) acid number, and low (such as no more than 0.2 meq/kg) residual alkalinity from an alkaline catalyst.

SUMMARY

In some respects, this specification is directed to processes for removing alkali metal ions from a polyether polyol. These processes comprise: (a) passing a mixture comprising the polyether polyol and the alkali metal ions through a first bed comprising a cation exchange resin comprising carboxylic acid and/or phosphonic acid groups to remove alkali metal ions from the mixture; and (b) passing the product of step (a) through a second bed comprising an anion exchange resin comprising quaternary ammonium groups and a cation exchange resin comprising carboxylic acid and/or phosphonic acid groups, wherein the first bed and the second bed are each substantially free of a cation exchange resin that comprises sulfonic acid groups.

In other respects, this specification relates to processes for producing a polyether polyol. These processes comprise: (a) adding an alkylene oxide onto an H-functional starter in the presence of an alkali metal catalyst to produce an alkali metal-containing crude polyol comprising a mixture comprising the polyether polyol and alkali metal ions; (b) passing the mixture through a first bed comprising a cation exchange resin comprising carboxylic acid and/or phosphonic acid groups to remove alkali metal ions from the mixture; and (c) passing the product of step (b) through a second bed comprising an anion exchange resin comprising quaternary ammonium groups and a cation exchange resin comprising carboxylic acid and/or phosphonic acid groups, wherein the first bed and the second bed are each substantially free of a cation exchange resin that comprises sulfonic acid groups.

The present specification is also directed to, among other things, systems for conducting such processes, polyether polyols purified by such processes, and polyurethanes, such as polyurethane foams, produced from such polyether polyols.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As indicated, in certain embodiments, the present specification is directed to processes for removing alkali metal ions from polyether polyols. Such removal of alkali metal ions may sometimes be referred to herein as "purifying" the polyether polyol. The term "polyether polyol" encompasses polyether ester polyols.

The polyether polyols subject to the methods of this specification can be prepared by adding one or more alkylene oxides having 2 to 10 carbon atoms, such as 2 to 6 carbon atoms, in the alkylene radical, and which are optionally substituted, to a H-functional starter molecule that contains at least 2, such as 2 to 8, or, in some cases, 2 to 4, active hydrogen atoms, in the presence of an alkaline catalyst.

The methods of the present specification are suitable for removing water and alkali metal ions from a wide range of polyols, in terms of their functionality, molecular weight and hydroxyl (OH) number. For example, the polyether polyols have a number average molecular weight of at least 150 gram/mole, such as at least 250 gram/mole, in some cases 700 gram/mole to 12,000 gram/mole, or, in some cases, 1000 to 12,000 gram/mole, and a hydroxyl number of 28 to 1050 mg KOH/gram, such as 28 to 650 mg KOH/gram.

In some implementations, however, the methods of this specification are particularly advantageous for use in connection with removing alkali metal ions from "long chain" polyether polyols, that is, polyether polyols that have a relatively low hydroxyl number. More specifically, in some implementations, the "long chain" polyether polyol has a hydroxyl number of no more than 56 mg KOH/gram, such as 25 to 56 mg KOH/gram, 25 to 40 mg KOH/gram, 25 to 36 mg KOH/gram, or, in some embodiments, 25 to 35 mg KOH/gram. As used herein, the term "hydroxyl number" refers to the number of reactive hydroxyl groups available for reaction, is expressed as the number of milligrams of potassium hydroxide equivalent to the hydroxyl content of one gram of the polyol, and is measured according to ASTM D4274-16. In addition, in some implementations, the "long chain" polyether polyol has a calculated number average molecular weight of at least 2800 gram/mole, such as 2800 to 10,000 gram/mole, 2800 to 8000 gram/mole, 2800 to 6000 gram/mole, in some cases, 3500 to 6000 gram/mole. The calculated number average molecular weights of the polyols described herein are calculated from the polyol's functionality and hydroxyl number according to the equation:

$$M_n = \frac{56100 * f}{OH\#}$$

in which f is the functionality of the polyol (the number of hydroxyl groups per molecule), OH # is the hydroxyl number of the polyol and is equal to the mass in milligrams of potassium hydroxide (56.1 grams/mol) equivalent to the hydroxyl content in one gram of the polyol compound (mg KOH/g), and $M_n$ is the number average molecular weight of the polyol. The polyol functionality referred to herein is the theoretical average nominal functionality of the polyol, that is, the functionality calculated based on the average number of hydroxyl groups per molecule of starter used to produce the polyol.

In addition, in some implementations, the polyol produced by processes of this specification has an acid number of less than 0.5 mg KOH/g, such as less than 0.2 mg KOH/g, or, in some cases, less than 0.1 mg KOH/g. The acid number of the polyol can be measured according to ASTM D7253-16.

As indicated, the polyether polyols described in this specification are alkali metal catalyzed alkoxylation reaction products of an alkylene oxide and an H-functional starter. Alkylene oxides suitable for use in preparing such polyether polyols include, for example, ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide and pinene oxide. In some implementations ethylene oxide (EO) and/or propylene oxide (PO) is used. More particularly, in some implementations, a ratio of EO and PO, based on the amount of alkylene oxide used, is between 5% by weight of EO/95% by weight of PO and 30% by weight of EO/70% by weight of PO. In addition to the alkylene oxides, it is also possible to use other comonomers which can be added individually or in a mixture with the alkylene oxides. The various alkylene oxides and any other comonomers can be metered in a mixture or in blocks. Ethylene oxide can be metered in, for example, in a mixture with other alkylene oxides or in blocks as a starting, middle or end block.

As used in this specification, "H-functional starter" refers to compounds having Zerewitinoff-active hydrogen atoms, such as 2 to 8 such hydrogen atoms, and, in some implementations, a molar mass of 17 g/mol to 1200 g/mol, such as 32 to 1200 g/mol, or 62 to 1200 g/mol. Exemplary Zerewitinoff-active hydrogen atoms are —OH, —NH$_2$ (primary amines), —NH— (secondary amines), —SH, and —CO$_2$H.

Specific examples of suitable OH-functional starter compounds are methanol, ethanol, 1-propanol, 2-propanol and higher aliphatic monols, such as fatty alcohols, phenol, alkyl-substituted phenols, propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, water, glycerol, trimethylolpropane, triethanolamine, pentaerythritol, sorbitol, sucrose, hydroquinone, catechol, resorcinol, bisphenol F, bisphenol A, 1,3,5-trihydroxybenzene, methylol-containing condensates of formaldehyde and phenol or melamine or urea, and Mannich bases. In some cases, the OH-functional starter may include a polycyclic polyol starter, such as any of the bicyclic polyols, tricyclic polyols, and polyols that include four or more rings per molecule, as are described in U.S. Pat. No. 10,544,158 at col. 4, line 29 to col. 5, line 19, the cited portion of which being incorporated herein by reference.

Examples of suitable starter compounds containing amino groups are ammonia, ethanolamine, diethanolamine, isopropanolamine, diisopropanolamine, ethylenediamine, hexamethylenediamine, aniline, the isomers of toluidine, the isomers of diaminotoluene, the isomers of diaminodiphenylmethane, and higher polycyclic products obtained in the condensation of aniline with formaldehyde to give diaminodiphenylmethane. In addition, starter compounds used may also be ring-opening products of cyclic carboxylic anhydrides and polyols. Examples are ring-opening products of phthalic anhydride, succinic anhydride and maleic anhydride on the one hand, and ethylene glycol, diethylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, pentaerythritol or sorbitol on the other hand. Ring-opening products of this kind can also be prepared in situ directly prior to the start of the alkylene oxide addition reaction in the polymerization reactor. In addition, it is also possible to use mono- or polyfunctional carboxylic acids directly as starter compounds. It is also possible to use mixtures of various H-functional starters.

An alkali metal ion-containing catalyst is used in the preparation of the polyether polyols that are the subject of the processes of this specification. Suitable catalysts are, for example, alkali metal hydrides, alkali metal carboxylates (for example those of monofunctional carboxylic acids), alkali metal hydroxides and alkali metal alkoxylates. Suitable alkali metal hydroxides include, for example, sodium hydroxide, potassium hydroxide or cesium hydroxide, and suitable alkali metal alkoxylates include alkali metal alkoxylates of mono- or polyfunctional alcohols. As the latter, it is also possible to use previously prepared alkylene oxide addition products of starter compounds containing Zerewitinoff-active hydrogen atoms having alkoxylate contents of 0.05% to 50% in terms of equivalents ("polymeric alkoxylates"). The alkoxylate content of the catalyst is understood to mean the proportion of Zerewitinoff-active hydrogen atoms removed by deprotonation by a base AOH (A=alkali metal) of all the Zerewitinoff-active hydrogen atoms that were originally present in the alkylene oxide addition product of the catalyst. The amount of the polymeric alkali metal alkoxylate used is guided by the catalyst concentration desired, and expressed as the concentration of AOH.

In some implementations, the alkali metal ion-containing catalyst is used in an amount of 0.01 to 15 weight percent, 0.01 to 5 weight percent, 0.2 to 3 weight percent, or, in some cases, 0.1 to 1.0 weight percent, based on the total weight of polyether polyol.

The catalyst can be supplied to the starter compound, for example, as a pure substance (often solids) or as an aqueous solution. By means of a stripping step preceding the alkylene oxide metering, water of dissolution and the water which arises, for example, through the reaction of the alkali metal hydroxides with the Zerewitinoff-active hydrogen atoms in the starter compounds may be removed. If, in the case of alkali metal hydroxide catalysis, aqueous solutions of starter compounds solid at room temperature are used, it may be appropriate to perform only one stripping step, for example, before commencement of the actual alkylene oxide addition phase or, if desired, after interruption of an already running alkylene oxide addition reaction.

In some embodiments, the starter compound is reacted with the alkylene oxide(s) at a temperature of 70° C. to 170° C., such as 100° C. to 160° C. Post-reactions can likewise be performed at higher temperatures (such as after raising the temperature to 100 to 170° C. or 100 to 150° C.). In the case of "long-chain" polyols, it may be desirable, in the case of attainment of high equivalent molar masses and in the case of metered addition of blocks having high contents of oxypropylene units, for example at 500 Da or higher equivalent molar masses, to restrict the reaction temperature to values of 120° C., or 110° C. or less, in order to reduce side reactions of the propylene oxide, especially the rearrangement thereof to allyl alcohol. Equivalent molar mass is understood to mean the number-average total molar mass of the material containing active hydrogen atoms divided by the number of active hydrogen atoms (functionality). The extent of these side reactions increases with the content of propylene oxide in the alkylene oxide mixture metered in; therefore, the restriction in the reaction temperature may gain importance when the propylene oxide content in the alkylene oxide mixture metered in exceeds values of 30% by weight, 50% by weight, or 70% by weight. The metered addition of blocks having high contents of oxyethylene units or blocks consisting purely of oxyethylene units, as well as post-reactions, can in turn be performed at higher temperatures (such as after raising the temperature to 120 to 170° C. or 120 to 150° C.).

In some cases, it may be necessary or desirable to keep the temperature of the exothermic alkylene oxide addition reaction at the desired level by cooling. Suitable such cooling can generally be affected via the reactor wall (such as with a cooling jacket or half-coil pipe) and by means of further heat exchange surfaces disposed internally in the reactor and/or externally in the pumped circulation system, for example in cooling coils, cooling cartridges, or plate, shell-and-tube or mixer heat exchangers.

Further information regarding suitable equipment and procedural aspects of producing polyether polyols of the type involved in this specification can be found in U.S. Pat. No. 10,131,743 B2 at col. 8, line 22 to col. 10, line 9, the cited portion of which being incorporated by reference herein.

In some embodiments of the processes of this specification, the alkali-metal ion containing catalyst and polyether polyol are, prior to purification of the polyether polyol, present in a mixture that also includes water. In certain embodiments, prior to any purification of the polyether polyol, water is present in such a mixture in an amount of at least 1% by weight, at least 3% by weight, or, in some cases, at least 4% by weight and up to 15% by weight, such as up to 13% by weight, up to 10% by weight, or up to 8% by weight, based on the total weight of polyether polyol present.

In some implementations, a mixture comprising water and a polar organic solvent ("First Mixture") is combined with a mixture comprising a polyether polyol and an alkali metal ion-containing catalyst ("Second Mixture"). Suitable polar organic solvents include, for example, $C_1$ to $C_4$ alkyl alcohols, such as methanol, ethanol, propanol, isopropanol, butanol, and tert-butanol, including mixtures thereof. In certain embodiments, the First Mixture is added in an amount of 10 to 40% by weight, based on the total weight of the First Mixture and the Second Mixture. In some embodiments, the relative weight ratio of polar organic solvent and water in the First Mixture is within a range of 1:1 to 10:1, such as 2:1 to 8:1, or, in some cases 3:1 to 5:1.

According to processes of this specification, a mixture comprising the polyether polyol and the alkali metal ions, which mixture may comprise a combination of the First Mixture and the Second Mixture described above, is passed through a first bed comprising a cation exchange resin comprising carboxylic acid and/or phosphonic acid groups to remove alkali metal ions from the mixture. More specifically, in some implementations, the foregoing mixture is passed through a bed comprising the cation exchange resin that is disposed in a container, such as a column, in order to remove alkali metal ion from the mixture. Suitable cation exchange resins include those of the gel type and those of the porous type and include resins having carboxylic acid groups (—COOH) and/or phosphonic acid groups (—$H_2O_3P$), such as, for example, those based on crosslinked polystyrene, including, without limitation, copolymers of styrene and divinylbenzene with phosphonic acid groups and/or carboxylic acids groups, as well as (meth)acrylic acid functional polymers. As used herein, the term "(meth) acrylic" is meant to encompass methacrylic and acrylic. Suitable cation exchange resins are commercially available and include, for example, those under the tradenames Amberlite™ (Dow), Lewatit® (Lanxess), Dowex™ (Dow), Diaion™ (Mitsubishi Chemical), and Relite™ (Resindion), to name a few. In certain embodiments of the processes of the present specification, the first bed comprising cation exchange resin has a volume of at least 10 cubic feet (0.28 cubic meter), such as at least 100 cubic feet (2.8 cubic meters), such as 10 to 1000 cubic feet (0.28 to 28 cubic meters), 100 to 1000 cubic feet (2.8 to 28 cubic meters), 100 to 500 cubic feet (2.8 to 14.2 cubic meters), or, in some cases, 200 to 400 cubic feet (5.7 to 11.3 cubic meters).

In certain embodiments, the product of the foregoing combining step is passed through the first bed of cation exchange resin at a resin bed temperature of 40 to 150° C., such as 40 to 80° C., and/or at a container pressure of 50 to 120 pounds per square inch [absolute](345 to 825 kilopascal), such as 65 to 85 pounds per square inch (445 to 590 kilopascal). In certain embodiments, the crude polyether polyol that enters the first bed has a content of alkali metal ion of at least 0.01% by weight, such as 0.05 to 1.0% by weight, based on the total weight of polyether polyol present. In certain embodiments, the purified polyether polyol that exits the first bed has an alkali metal ion content of no more than 100 ppm, such as no more than 10 ppm, no more than 5 ppm, or, in some cases, no more than 1 ppm, based on total weight of polyether polyol present.

In some implementations, the container, such as column, that includes the first bed is operated in a liquid-full manner throughout the process. As used herein, when it is stated that the container is operated "liquid-full" it means that the liquid level in the container in which the cation exchange resin is disposed is maintained such that there is little or no gas/liquid interface in the container and/or that the liquid level is maintained above the level of the bed of cation exchange resin. In some embodiments, therefore, the liquid level is maintained at a level that is at least 90% of the total container height throughout the process, such as at least 95% of the total container height, or, in yet other cases, at least 99% of the total container height, in each case throughout the process. In some embodiments, the liquid level is maintained at 100% of the total container height throughout the process and, as such, in these embodiments of the process there is no gas/liquid interface in the container. In some embodiments, no gas is added to the container to maintain a gas/liquid interface and/or the rate at which liquid is pumped out of the container is not controlled to maintain a gas/liquid interface in the container. Rather, in some embodiments, liquids are moved through the container by virtue of feed pressure to the container, such as pump pressure or other pressure sources, thereby eliminating, or at least virtually eliminating, back mixing of the polyether polyol. As used herein, "throughout the process" means that the container is maintained liquid-full continuously while the polyether polyol mixture is passed there through for the purpose of removing alkali metal ions therefrom.

According to the processes of this specification, the purified polyether polyol that exits the first bed is thereafter passed through a second bed comprising an anion exchange resin comprising quaternary ammonium groups and a cation exchange resin comprising carboxylic acid and/or phosphonic acid groups. The second bed is thus a so-called "mixed bed".

As with the first bed, suitable cation exchange resins for use in the second bed include those of the gel type and those of the porous type and include resins having carboxylic acid groups (—COOH) and/or phosphonic acid groups (—H$_2$O$_3$P), such as, for example, those based on crosslinked polystyrene, including, without limitation, copolymers of styrene and divinylbenzene with phosphonic acid groups and/or carboxylic acids groups, as well as (meth)acrylic acid functional polymers. Suitable anion exchange resins for use in the second bed also include those of the gel type and those of the porous type and include resins having quaternary ammonium groups, such as trimethylammonium groups. Suitable anion exchange resins include, without limitation, those based on crosslinked polystyrene.

Suitable cation exchange resins and anion exchange resins for use in the second bed are commercially available and include, for example, those under the tradenames Amberlite™ (Dow), Lewatit® (Lanxess), Dowex™ (Dow), Diaion™ (Mitsubishi Chemical), and Relite™ (Resindion), to name a few. In certain embodiments of the processes of the present specification, the second bed has a volume of at least 10 cubic feet (0.28 cubic meter), such as at least 100 cubic feet (2.8 cubic meters), such as 10 to 1000 cubic feet (0.28 to 28 cubic meters), 100 to 1000 cubic feet (2.8 to 28 cubic meters), 100 to 500 cubic feet (2.8 to 14.2 cubic meters), or, in some cases, 200 to 400 cubic feet (5.7 to 11.3 cubic meters).

In certain embodiments, the purified polyether polyol that exits the first bed is passed through the second bed at a resin bed temperature of 40 to 150° C., such as 40 to 80° C., and/or at a container pressure of 50 to 120 pounds per square inch [absolute] (345 to 825 kilopascal), such as 65 to 85 pounds per square inch (445 to 590 kilopascal).

Further, in some implementations, the container, such as column, that includes the second bed is also operated in a liquid-full manner throughout the process. In some embodiments, therefore, the liquid level is maintained at a level that is at least 90% of the total container height throughout the process, such as at a level that is at least 95% of the total container height, or, in yet other cases, at a level that is at least 99% of the total container height, in each case throughout the process. In some embodiments, the liquid level is maintained at 100% of the total container height throughout the process and, as such, in these embodiments of the process there is no gas/liquid interface in the container. In some embodiments, no gas is added to the container to maintain a gas/liquid interface and/or the rate at which liquid is pumped out of the container is not controlled to maintain a gas/liquid interface in the container. Rather, in some embodiments of the process, liquids are moved through the container by virtue of feed pressure to the container, such as pump pressure or other pressure sources, thereby eliminating, or at least virtually eliminating, back mixing of the polyether polyol.

In the processes of this specification, the first bed and the second bed are each substantially or, in some cases, completely free of a strong cation exchange resin, that is, a cation exchange resin that comprises sulfonic acid groups. As used herein, "substantially free" when used with reference to the presence of a strong cation exchange resin in each of the first bed and the second bed, means that strong cation exchange resin is present in the bed an amount of no more than 2% by weight, no more than 1% by weight, or, in some cases, no more than 0.5% by weight, based on the total weight of ion exchange resin present in the bed.

After passing through the container comprising the second bed, the purified polyether polyol is often further processed to remove organic solvent and water. Such further processing often involves distillation, including distillation under at least atmospheric and/or vacuum conditions, either of which may be carried out batchwise or continuously. In some embodiments, for example, a combination of at least atmospheric distillation and vacuum distillation is used.

For example, in some embodiments, the at least atmospheric distillation step is used to remove a portion of the water and/or organic solvent under at least atmospheric pressure. As used herein, "atmospheric pressure" is synonymous with barometric pressure and refers to the pressure exerted by the weight of the atmosphere in the location in which the purified polyether polyol is disposed. In certain embodiments, for this at least atmospheric distillation, the temperature of the polyether polyol is maintained at 100 to 180° C., such as 100 to 160° C. In certain embodiments, the at least atmospheric distillation is conducted at a pressure above atmospheric pressure, such as up to 30 psia (207 kPa).

In some embodiments, an evaporator removes additional water and/or organic solvent from the polyether polyol under vacuum. Transition to the vacuum distillation step includes reducing the pressure to a range of 50 mmHg to 5 mmHg, and, in some embodiments, to a temperature of 100 to 180° C. In some implementations, steam is sparged sub-surface to the liquid polyether in a flash tank evaporator under vacuum using a pipe sparger to evenly distribute the steam through the polyether polyol. For example, in some implementations, steam is sparged at a rate that results in a weight ratio of steam to polyol of at least 0.0005:1, such as at least 0.009:1. In some cases, the steam may assist in the removal of 2M2P, isopropanol and aldehydes from the polyether polyol. Water injection can be similarly effective in assisting the vacuum stripping but requires additional heating to vaporize the water.

In certain embodiments, following distillation, water is present with the polyether polyol in an amount of no more than 10,000 ppm, no more than 1,000 ppm, or no more than 500 ppm (when measured according to ASTM D4672 (2012)), based on total weight of polyether polyol.

It was discovered, surprisingly, that the polyether polyol purification processes of this specification, which entail use of a weak cation exchange followed by a mixed weak cation exchange and strong anion exchange, in the substantial absence of a strong cation exchange resin, enables purification of low hydroxyl number polyether polyols of the type described earlier in a manner that results in a purified polyether polyol that, after removal of organic solvent and water (such as by distillation as described above) that has a 2M2P content of no more than 5 ppm, such as no more than 3 ppm or no more than 1 ppm measured by Headspace Gas Chromatography and Mass Spectrometry (HS GC-MS), based on total weight of the polyether polyol present. In some implementations, such a purified polyether polyol may have an acid number of no more than 0.1 mg KOH/g or no more than 0.05 mg KOH/g, and a residual alkalinity, determined by visual titration, of no more than 0.2 meq/kg or no more than 0.1 meq/kg, measured according to ASTM D7253-16.

The 2M2P amounts referred to herein are measured by Headspace Gas Chromatography and Mass Spectrometry (HS GC-MS). HS GC-MS can be conducted using an Agilent 7697A Headspace Sampler using headspace conditions of: Oven Temperature: 100° C., Loop Temperature:

130° C., Transfer Line Temperature: 140° C., Vial Equilibration: 30 minutes, Injection Time: 1.0 minutes, GC Cycle Time: 20 minutes, Vial Size: 20 mL, and Fill Pressure: 10 psi, and GC MS conditions of: Column: RTX-624 30 m×250 μm×1.4 μm, Carrier Gas: Helium, Flow: 1.2 mL/min, constant, Oven Profile: 40° C. hold 4 min and 30° C./min to 260° C. hold 3 min, Run Time: 14.33 minutes, Injection Temp: 250° C., Injection Mode: Split 40:1, MS Mode: ei Scan, Mass Range: 28.5-350, MS source: 230° C., and MS Quad: 150° C. The measurement sample is prepared by weighing 5.0 grams of the sample into a 20 mL headspace vial and adding 50 μL of a solution of 20 ppm 1,4-dioxane in propylene carbonate.

Regeneration of the exchange resins is eventually necessary with the processes of the present invention. It is sometimes desirable to analytically measure the alkali metal-ion content in the effluent from the first bed to determine when regeneration is necessary. Regeneration of the cation exchange resin can be done by treating the resin with an acid, such as hydrochloric acid and/or sulfuric acid, though other mineral acids can be used. In some embodiments, an acid solution having acid concentration of 1 to 20% by weight, such as 2 to 10% by weight is used.

The polyether polyols purified by the processes of the present specification may be used in a variety of applications. For example, such polyether polyols may be reacted with one or more isocyanates to provide polyurethane products including, but not limited to, coatings, adhesives, sealants, elastomers, foams, including flexible foams, and the like. Suitable organic polyisocyanates for forming such polyurethanes include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Examples of such isocyanates include those represented by the formula:

in which n is a number from 2-5, such as 2-3, and Q is an aliphatic hydrocarbon group; a cycloaliphatic hydrocarbon group; an araliphatic hydrocarbon group; or an aromatic hydrocarbon group.

Various aspects of the subject matter described in this specification are set out in the following clauses:

Clause 1. A process for removing alkali metal ions from a polyether polyol, comprising: (a) passing a mixture comprising the polyether polyol and the alkali metal ions through a first bed comprising a cation exchange resin comprising carboxylic acid and/or phosphonic acid groups to remove alkali metal ions from the mixture; and (b) passing the product of step (a) through a second bed comprising an anion exchange resin comprising quaternary ammonium groups and a cation exchange resin comprising carboxylic acid and/or phosphonic acid groups to thereby produce a purified polyether polyol, wherein the first bed and the second bed are each substantially free of a cation exchange resin that comprises sulfonic acid groups.

Clause 2. The process of clause 1, wherein the polyether polyol is prepared by adding an alkylene oxide having 2 to 10 carbon atoms, such as 2 to 6 carbon atoms, in the alkylene radical to a H-functional starter, which contains at least 2, such as 2 to 8, or 2 to 4 active hydrogen atoms, in the presence of an alkali metal ion-containing catalyst.

Clause 3. The process of clause 1 or clause 2, wherein the polyether polyol has a number average molecular weight of at least 150 gram/mole, at least 250 gram/mole, 700 gram/mole to 12,000 gram/mole, or 1000 to 12,000 gram/mole.

Clause 4. The process of one of clause 1 to clause 3, wherein the polyether polyol has a hydroxyl number of 28 to 1050 mg KOH/gram, 28 to 650 mg KOH/gram, no more than 56 mg KOH/gram, 25 to 56 mg KOH/gram, 25 to 40 mg KOH/gram, 25 to 36 mg KOH/gram, or 25 to 35 mg KOH/gram, measured according to ASTM D4274-16.

Clause 5. The process of clause 4, wherein the polyether polyol has a calculated number average molecular weight of at least 2800 gram/mole, 2800 to 10,000 gram/mole, 2800 to 8000 gram/mole, 2800 to 6000 gram/mole, or 3500 to 6000 gram/mole.

Clause 6. The process of one of clause 2 to clause 6, wherein the alkylene oxide comprises ethylene oxide (EO) and/or propylene oxide (PO), such as where a ratio of EO and PO, based on the weight of alkylene oxide used, is 5% by weight of EO/95% by weight of PO to 30% by weight of EO/70% by weight of PO.

Clause 7. The process of one of clause 2 to clause 6, wherein the H-functional starter comprises methanol, ethanol, 1-propanol, 2-propanol and higher aliphatic monols, such as fatty alcohols, phenol, alkyl-substituted phenols, propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, water, glycerol, trimethylolpropane, triethanolamine, pentaerythritol, sorbitol, sucrose, hydroquinone, catechol, resorcinol, bisphenol F, bisphenol A, 1,3,5-trihydroxybenzene, a methylol-containing condensate of formaldehyde and phenol or melamine or urea, a Mannich base, ammonia, ethanolamine, diethanolamine, isopropanolamine, diisopropanolamine, ethylenediamine, hexamethylenediamine, aniline, an isomer of toluidine, an isomer of diaminotoluene, an isomer of diaminodiphenylmethane, a polycyclic product obtained in the condensation of aniline with formaldehyde to give diaminodiphenylmethane, a ring-opening product of phthalic anhydride, succinic anhydride and maleic anhydride on the one hand, and ethylene glycol, diethylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, pentaerythritol or sorbitol on the other hand, a mono- or polyfunctional carboxylic acid, a polycyclic polyol, such as a bicyclic polyol, tricyclic polyol, and/or a polyol that includes four or more rings per molecule, or a mixture of any two or more thereof.

Clause 8. The process of one of clause 2 to clause 7, wherein the alkali metal ion-containing catalyst comprises an alkali metal hydride, an alkali metal carboxylate, an alkali metal hydroxide, an alkali metal alkoxylate, or a mixture of any two or more thereof, such as sodium hydroxide, potassium hydroxide, cesium hydroxide, an alkali metal alkoxylate of a mono- or polyfunctional alcohol.

Clause 9. The process of one of clause 1 to clause 8, wherein the mixture comprising the polyether polyol and the alkali metal ions is combined with a mixture comprising water and a polar organic solvent prior to passing the mixture comprising the polyether polyol and the alkali metal ions through the first bed.

Clause 10. The process of clause 9, wherein the polar organic solvent comprises methanol, ethanol, propanol, isopropanol, butanol, tert-butanol, or a mixture of any two or more thereof.

Clause 11. The process of clause 9 or clause 10, wherein the mixture comprising water and polar organic solvent is present in an amount of 10 to 40% by weight, based on the total combined weight of (i) the mixture comprising water and polar organic solvent and (ii) the mixture comprising the polyether polyol and the alkali metal ions.

Clause 12. The process of one of clause 9 to clause 11, wherein the relative weight ratio of polar organic solvent and water in the mixture comprising water and polar organic solvent is within a range of 1:1 to 10:1, 2:1 to 8:1, or 3:1 to 5:1.

Clause 13. The process of one of clause 1 to clause 12, wherein the cation exchange resin of the first bed is based on crosslinked polystyrene, such as a copolymer of styrene and divinylbenzene.

Clause 14. The process of one of clause 1 to clause 13, wherein the mixture comprising the polyether polyol and the alkali metal ions is passed through the first bed of cation exchange resin at a resin bed temperature of 40 to 150° C. or 40 to 80° C., and/or at a container pressure of 50 to 120 pounds per square inch [absolute] (345 to 825 kilopascal) or 65 to 85 pounds per square inch (445 to 590 kilopascal).

Clause 15. The process of one of clause 1 to clause 14, wherein the polyether polyol that enters the first bed has a content of alkali metal ion of at least 0.01% by weight or 0.05 to 1.0% by weight, based on the total weight of polyether polyol.

Clause 16. The process of one of clause 1 to clause 15, wherein the purified polyether polyol that exits the first bed has an alkali metal ion content of no more than 100 ppm, no more than 10 ppm, no more than 5 ppm, or no more than 1 ppm, based on total weight of polyether polyol.

Clause 17. The process of one of clause 1 to clause 16, wherein a container, such as a column, that includes the first bed is operated liquid-full throughout the process, such as where the liquid level in the container is maintained at a level that is at least 90% of the total container height, at least 95% of the total container height, at least 99% of the total container height, or at 100% of the total container height throughout the process.

Clause 18. The process of one of clause 1 to clause 17, wherein the cation exchange resin of the second bed is based on crosslinked polystyrene, such as a copolymer of styrene and divinylbenzene.

Clause 19. The process of one of clause 1 to clause 18, wherein the anion exchange resin of the second bed is crosslinked polystyrene.

Clause 20. The process of one of clause 1 to clause 19, wherein the purified polyether polyol that exits the first bed is passed through the second bed at a resin bed temperature of 40 to 150° C. or 40 to 80° C., and/or at a container pressure of 50 to 120 pounds per square inch [absolute] (345 to 825 kilopascal) or 65 to 85 pounds per square inch (445 to 590 kilopascal).

Clause 21. The process of one of clause 1 to clause 20, wherein a container, such as a column, that includes the second bed is operated liquid-full throughout the process, such as where the liquid level in the container is maintained at a level that is at least 90% of the total container height, at least 95% of the total container height, at least 99% of the total container height, or at 100% of the total container height throughout the process.

Clause 22. The process of one of clause 1 to clause 21, wherein cation exchange resin comprising sulfonic acid groups is present in an amount of no more than 2% by weight, no more than 1% by weight, no more than 0.5% by weight, or 0% by weight, based on the total weight of ion exchange resin used in each bed.

Clause 23. The process of one of clause 1 to clause 22, further comprising removing organic solvent and water from the polyether polyol, such as by distilling the polyether polyol, such as where the distilling comprises a combination of at least atmospheric distillation and vacuum distillation, such as where the at least atmospheric distillation is conducted at a polyether polyol temperature of 100 to 180° C. or 100 to 160° C. and at a pressure above atmospheric pressure, such as up to 30 psia (207 kPa), and/or the vacuum distillation comprises reducing the pressure to the range of 50 mmHg to 5 mmHg.

Clause 24. The process of clause 23, wherein the vacuum distillation comprises sparging steam sub-surface to the polyether polyol in an evaporator under vacuum, such as where steam is sparged at a rate that results in a weight ratio of steam to polyol of at least 0.0005:1, such as at least 0.009:1.

Clause 25. The process of clause 23 or clause 24, wherein, after removal of organic solvent and water, the purified polyether polyol has a 2M2P content of no more than 5 ppm, no more than 3 ppm, or no more than 1 ppm, based on total weight of the polyether polyol, as measured by Headspace Gas Chromatography and Mass Spectrometry (HS GC-MS).

Clause 26. The process of one of clause 1 to clause 25, wherein the purified polyether polyol has an acid number of no more than 0.1 mg KOH/g or no more than 0.05 mg KOH/g, measured according to ASTM D7253-16.

Clause 27. The process of one of clause 1 to clause 26, wherein the purified polyether polyol has an alkalinity, determined by visual titration, of no more than 0.2 meq/kg or no more than 0.1 meq/kg.

Clause 28. The process of one of clause 23 to clause 27, wherein, following the distillation, water is present in the purified polyether polyol in an amount of no more than 10,000 ppm, no more than 1,000 ppm, or no more than 500 ppm (when measured according to ASTM D4672-12), based on total weight of polyether polyol.

Clause 29. A process for producing a polyether polyol, comprising: (a) adding an alkylene oxide onto an H-functional starter in the presence of an alkali metal catalyst to produce an alkali metal-containing crude polyol comprising a mixture comprising the polyether polyol and alkali metal ions; (b) passing the mixture through a first bed comprising a cation exchange resin comprising carboxylic acid and/or phosphonic acid groups to remove alkali metal ions from the mixture; and (c) passing the product of step (b) through a second bed comprising an anion exchange resin comprising quaternary ammonium groups and a cation exchange resin comprising carboxylic acid and/or phosphonic acid groups, wherein the first bed and the second bed are each substantially free of a cation exchange resin that comprises sulfonic acid groups.

Clause 30. The process of clause 29, wherein the alkylene oxide has 2 to 10 carbon atoms, such as 2 to 6 carbon atoms, in the alkylene radical and the H-functional starter has at least 2, such as 2 to 8, or 2 to 4 active hydrogen atoms.

Clause 31. The process of clause 29 or clause 30, wherein the polyether polyol has a number average molecular weight of at least 150 gram/mole, at least 250 gram/mole, 700 gram/mole to 12,000 gram/mole, or 1000 to 12,000 gram/mole.

Clause 32. The process of one of clause 29 to clause 31, wherein the polyether polyol has a hydroxyl number of 28 to 1050 mg KOH/gram, 28 to 650 mg KOH/gram, no more than 56 mg KOH/gram, 25 to 56 mg KOH/gram, 25 to 40 mg KOH/gram, 25 to 36 mg KOH/gram, or 25 to 35 mg KOH/gram, measured according to ASTM D4274-16.

Clause 33. The process of clause 32, wherein the polyether polyol has a calculated number average molecular weight of at least 2800 gram/mole, 2800 to 10,000 gram/mole, 2800 to 8000 gram/mole, 2800 to 6000 gram/mole, or 3500 to 6000 gram/mole.

Clause 34. The process of one of clause 29 to clause 33, wherein the alkylene oxide comprises ethylene oxide (EO) and/or propylene oxide (PO), such as where a ratio of EO and PO, based on the weight of alkylene oxide used, is 5% by weight of EO/95% by weight of PO to 30% by weight of EO/70% by weight of PO.

Clause 35. The process of one of clause 29 to clause 34, wherein the H-functional starter comprises methanol, ethanol, 1-propanol, 2-propanol and higher aliphatic monols, such as fatty alcohols, phenol, alkyl-substituted phenols, propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, water, glycerol, trimethylolpropane, triethanolamine, pentaerythritol, sorbitol, sucrose, hydroquinone, catechol, resorcinol, bisphenol F, bisphenol A, 1,3,5-trihydroxybenzene, a methylol-containing condensate of formaldehyde and phenol or melamine or urea, a Mannich base, ammonia, ethanolamine, diethanolamine, isopropanolamine, diisopropanolamine, ethylenediamine, hexamethylenediamine, aniline, an isomer of toluidine, an isomer of diaminotoluene, an isomer of diaminodiphenylmethane, a polycyclic product obtained in the condensation of aniline with formaldehyde to give diaminodiphenylmethane, a ring-opening product of phthalic anhydride, succinic anhydride and maleic anhydride on the one hand, and ethylene glycol, diethylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, pentaerythritol or sorbitol on the other hand, a mono- or polyfunctional carboxylic acid, a polycyclic polyol, such as a bicyclic polyol, tricyclic polyol, and/or a polyol that includes four or more rings per molecule, or a mixture of any two or more thereof.

Clause 36. The process of one of clause 29 to clause 35, wherein the alkali metal ion-containing catalyst comprises an alkali metal hydride, an alkali metal carboxylate, an alkali metal hydroxide, an alkali metal alkoxylate, or a mixture of any two or more thereof, such as sodium hydroxide, potassium hydroxide, cesium hydroxide, an alkali metal alkoxylate of a mono- or polyfunctional alcohol.

Clause 37. The process of one of clause 29 to clause 36, wherein the mixture comprising the polyether polyol and the alkali metal ions is combined with a mixture comprising water and a polar organic solvent prior to passing the mixture comprising the polyether polyol and the alkali metal ions through the first bed.

Clause 38. The process of clause 37, wherein the polar organic solvent comprises methanol, ethanol, propanol, isopropanol, butanol, tert-butanol, or a mixture of any two or more thereof.

Clause 39. The process of clause 37 or clause 38, wherein the mixture comprising water and polar organic solvent is present in an amount of 10 to 40% by weight, based on the total combined weight of (i) the mixture comprising water and polar organic solvent and (ii) the mixture comprising the polyether polyol and the alkali metal ions.

Clause 40. The process of one of clause 37 to clause 39, wherein the relative weight ratio of polar organic solvent and water in the mixture comprising water and polar organic solvent is within a range of 1:1 to 10:1, 2:1 to 8:1, or 3:1 to 5:1.

Clause 41. The process of one of clause 29 to clause 40, wherein the cation exchange resin of the first bed is based on crosslinked polystyrene, such as a copolymer of styrene and divinylbenzene.

Clause 42. The process of one of clause 29 to clause 41, wherein the mixture comprising the polyether polyol and the alkali metal ions is passed through the first bed of cation exchange resin at a resin bed temperature of 40 to 150° C. or 40 to 80° C., and/or at a container pressure of 50 to 120 pounds per square inch [absolute] (345 to 825 kilopascal) or 65 to 85 pounds per square inch (445 to 590 kilopascal).

Clause 43. The process of one of clause 29 to clause 42, wherein the polyether polyol that enters the first bed has a content of alkali metal ion of at least 0.01% by weight or 0.05 to 1.0% by weight, based on the total weight of polyether polyol.

Clause 44. The process of one of clause 29 to clause 43, wherein the purified polyether polyol that exits the first bed has an alkali metal ion content of no more than 100 ppm, no more than 10 ppm, no more than 5 ppm, or no more than 1 ppm, based on total weight of polyether polyol.

Clause 45. The process of one of clause 29 to clause 44, wherein a container, such as a column, that includes the first bed is operated liquid-full throughout the process, such as where the liquid level in the container is maintained at a level that is at least 90% of the total container height, at least 95% of the total container height, at least 99% of the total container height, or at 100% of the total container height throughout the process.

Clause 46. The process of one of clause 29 to clause 45, wherein the cation exchange resin of the second bed is based on crosslinked polystyrene, such as a copolymer of styrene and divinylbenzene.

Clause 47. The process of one of clause 29 to clause 46, wherein the anion exchange resin of the second bed is crosslinked polystyrene.

Clause 48. The process of one of clause 29 to clause 47, wherein the purified polyether polyol that exits the first bed is passed through the second bed at a resin bed temperature within the range of 40 to 150° C. or 40 to 80° C., and/or at a container pressure of 50 to 120 pounds per square inch [absolute] (345 to 825 kilopascal) or 65 to 85 pounds per square inch (445 to 590 kilopascal).

Clause 49. The process of one of clause 29 to clause 48, wherein a container, such as a column, that includes the second bed is operated liquid-full throughout the process, such as where the liquid level in the container is maintained at a level that is at least 90% of the total container height, at least 95% of the total container height, at least 99% of the total container height, or at 100% of the total container height throughout the process.

Clause 50. The process of one of clause 29 to clause 49, wherein cation exchange resin that comprises sulfonic acid groups is present in an amount of no more than 2% by weight, no more than 10% by weight, no more than 0.5% by weight, or 0% by weight, based on the total weight of ion exchange resin used in each bed.

Clause 51. The process of one of clause 29 to clause 50, further comprising removing organic solvent and water from the polyether polyol, such as by distilling the polyether polyol, such as where the distilling comprises a combination of at least atmospheric distillation and vacuum distillation, such as where the at least atmospheric distillation is conducted at a polyether polyol temperature of 100 to 180° C. or 100 to 160° C. and at a pressure above atmospheric pressure, such as up to 30 psia (207 kPa), and/or the vacuum distillation comprises reducing the pressure to the range of 50 mmHg to 5 mmHg.

Clause 52. The process of clause 51, wherein the vacuum distillation comprises sparging steam sub-surface to the polyether polyol in an evaporator under vacuum. such as where steam is sparged at a rate that results in a weight ratio of steam to polyol of at least 0.0005:1, such as at least 0.009:1.

Clause 53. The process of clause 51 or clause 52, wherein, after removal of organic solvent and water, the purified polyether polyol has a 2M2P content of no more than 5 ppm, no more than 3 ppm, or no more than 1 ppm, based on total weight of the polyether polyol, as measured by Headspace Gas Chromatography and Mass Spectrometry (HS GC-MS).

Clause 54. The process of one of clause 29 to clause 53, wherein the purified polyether polyol has an acid number of no more than 0.1 mg KOH/g or no more than 0.05 mg KOH/g measured according to ASTM D7253-16.

Clause 55. The process of one of clause 29 to clause 54, wherein the purified polyether polyol has an alkalinity, determined by visual titration, of no more than 0.2 meq/kg or no more than 0.1 meq/kg.

Clause 56. The process of one of clause 51 to clause 55, wherein, following the distillation, water is present in the purified polyether polyol in an amount of no more than 10,000 ppm, no more than 1,000 ppm, or no more than 500 ppm (when measured according to ASTM D4672-12), based on total weight of polyether polyol.

The non-limiting and non-exhaustive examples that follow are intended to further describe various non-limiting and non-exhaustive embodiments without restricting the scope of the embodiments described in this specification.

EXAMPLES

Example 1: Comparative 20 kg of a crude glycerin-based polyether polyol with a nominal hydroxyl number of 28 mg KOH/g and a potassium concentration of 0.3 wt % on a KOH basis was mixed with a solution of isopropanol and water to make a mixture of 80 wt % polyether polyol, 17 wt % isopropanol and 3 wt % water. This mixture was fed to two ion exchange beds arranged in series at a temperature of 50-60° C. at a rate of 8-24 bed volumes per hour. The first bed contained a weak acid resin, (e.g. Lanxess CNP 80, Purolite PPC-104Plus, Amberlite HPR 8400-H, etc.) and the second bed contained a 50/50 mixture (by weight) of strong acid resin, Amberlite HPR 2900-H and anion resin, Amberlite IRA 900-OH (standard mixed bed). The mixture was collected in a heated flask after the ion exchange beds and heated to 100-130° C. The flask was maintained under vacuum (5-50 mm Hg) to remove isopropanol and water from the mixture. After stripping for sufficient time (typically >3 hours) to reach a water concentration of ≤0.08 wt %, a standard antioxidant such as Irganox 1076, was added to the purified product. The volatile content of the purified polyol was then measured by headspace GC-MS and 17.8 ppm 2-Methyl-2-Pentenal (2M2P) was found in the sample.

Example 2: Inventive

The same crude polyol described in Example 1 was used to make a mixture of 80 wt % polyether polyol, 17 wt % isopropanol and 3 wt % water. This mixture was fed to two ion exchange beds arranged in series at a temperature of 50-60° C. at a rate of 8-24 bed volumes per hour. The first bed contained a weak acid resin, (e.g. Lanxess CNP 80, Purolite PPC-104Plus, Amberlite HPR 8400-H, etc.) and the second bed contained a 50/50 mixture (by weight) of weak acid resin, Amberlite HPR 8400-H and anion resin, Amberlite IRA 900-OH. The mixture was collected in a heated flask after the ion exchange beds and heated to 100-130° C. The flask was maintained under vacuum (5-50 mm Hg) to remove isopropanol and water from the mixture. After stripping for sufficient time (typically >3 hours) to reach a water concentration of ≤0.08 wt %, a standard antioxidant, such as Irganox 1076, was added to the purified product. The volatile content of the purified polyol was then measured by headspace GC-MS and <0.38 ppm 2-Methyl-2-Pentenal (2M2P) was found in the sample.

Example 3: Comparative

The same crude polyol described in Example 1 was used to make a mixture of 80 wt % polyether polyol, 17 wt % isopropanol and 3 wt % water. This mixture was fed to two ion exchange beds arranged in series at a temperature of 50-60° C. at a rate of 8-24 bed volumes per hour. The first bed contained a weak acid resin, (e.g. Lanxess CNP 80, Purolite PPC-104Plus, Amberlite HPR 8400-H, etc.) and the second bed contained a 30/20/50 mixture (by weight) of weak acid resin, Amberlite HPR 8400-H, strong acid resin, Amberlite HPR 2900-H and anion resin, Amberlite IRA 900-OH. The mixture was collected in a heated flask after the ion exchange beds and heated to 100-130° C. The flask is maintained under vacuum (5-50 mm Hg) to remove the isopropanol and water from the mixture. After stripping for sufficient time (typically >3 hours) to reach a water concentration of ≤0.08 wt %, a standard antioxidant, such as Irganox 1076, was added to the purified product. The volatile content of the purified polyol was then measured by headspace GC-MS and 61.0 ppm 2-Methyl-2-Pentenal (2M2P) was found in the sample.

Example 4: Comparative

The same crude polyol described in Example 1 was used to make a mixture of 80 wt % polyether polyol, 17 wt % isopropanol and 3 wt % water. This mixture was fed to two ion exchange beds arranged in series at a temperature of 50-60° C. at a rate of 8-24 bed volumes per hour. The first bed contained a weak acid resin, (e.g. Lanxess CNP 80, Purolite PPC-104Plus, Amberlite HPR 8400-H, etc.) and the second bed contained a 45/5/50 mixture (by weight) of weak acid resin, Amberlite HPR 8400-H, strong acid resin, Amberlite HPR 2900-H and anion resin, Amberlite IRA 900-OH. The mixture was collected in a heated flask after the ion exchange beds and heated to 100-130° C. The flask was maintained under vacuum (5-50 mm Hg) to remove isopropanol and water from the mixture. After stripping for sufficient time (typically >3 hours) to reach a water concentration of ≤0.08 wt %, a standard antioxidant, such as Irganox 1076, was added to the purified product. The volatile content of the purified polyol was then measured by headspace GC-MS and 64.7 ppm 2-Methyl-2-Pentenal (2M2P) was found in the sample.

Example 5: Inventive

The same crude polyol described in Example 1 was used to make a mixture of 80 wt % polyether polyol, 17 wt % isopropanol and 3 wt % water. The mixture was fed to two ion exchange beds arranged in series at a temperature of 50-60° C. at a rate of 8-24 bed volumes per hour. The first bed contained a weak acid resin, (e.g. Lanxess CNP 80, Purolite PPC-104Plus, Amberlite HPR 8400-H, etc.) and the second bed contained a 49.5/0.5/50 mixture (by weight) of weak acid resin, Amberlite HPR 8400-H, strong acid resin, Amberlite HPR 2900-H and anion resin, Amberlite IRA 900-OH. The mixture was collected in a heated flask after the ion exchange beds and heated to 100-130° C. The flask was maintained under vacuum (5-50 mm Hg) to remove isopropanol and water from the mixture. After stripping for sufficient time (typically >3 hours) to reach a water concentration of ≤0.08 wt %, a standard antioxidant, such as Irganox 1076, was added to the purified product. The volatile content of the purified polyol was then measured by headspace GC-MS and 3.19 ppm 2-Methyl-2-Pentenal (2M2P) was found in the sample.

Example 6: Inventive

The same crude polyol described in Example 1 was used to make a mixture of 80 wt % polyether polyol, 17 wt % isopropanol and 3 wt % water. This mixture was fed to two ion exchange beds arranged in series at a temperature of 50-60° C. at a rate of 8-24 bed volumes per hour. The first bed contained a weak acid resin, (e.g. Lanxess CNP 80, Purolite PPC-104Plus, Amberlite HPR 8400-H, etc.) and the second bed contained a 49.5/0.5/50 mixture (by weight) of weak acid resin, Amberlite HPR 8400-H, strong acid resin, Amberlite HPR 2900-H and anion resin, Amberlite IRA 900-OH. The mixture was collected in a heated flask after the ion exchange beds and heated to 100-130° C. The flask was maintained under vacuum (5-50 mm Hg) to remove isopropanol and water from the mixture. After stripping for sufficient time (typically >3 hours) to reach a water concentration of ≤0.08 wt %, a standard antioxidant, such as Irganox 1076, was added to the purified product. The volatile content of the purified polyol was then measured by headspace GC-MS and <0.38 ppm 2-Methyl-2-Pentenal (2M2P) was found in the sample.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for removing alkali metal ions from a polyether polyol, comprising: (a) passing a mixture comprising the polyether polyol and the alkali metal ions through a first bed comprising a cation exchange resin comprising carboxylic acid and/or phosphonic acid groups to remove alkali metal ions from the mixture; and (b) passing the product of step (a) through a second bed comprising an anion exchange resin comprising quaternary ammonium groups and a cation exchange resin comprising carboxylic acid and/or phosphonic acid groups to thereby produce a purified polyether polyol, wherein the first bed and the second bed are each free of a cation exchange resin that comprises sulfonic acid groups.

2. The process of claim 1, wherein the polyether polyol has a hydroxyl number of no more than 56 mg KOH/gram, measured according to ASTM D4274-16.

3. The process of claim 2, wherein the polyether polyol has a hydroxyl number of 25 to 35 mg KOH/gram, measured according to ASTM D4274-16.

4. The process of claim 1, wherein the mixture comprising the polyether polyol and the alkali metal ions is combined with a mixture comprising water and a polar organic solvent prior to passing the mixture comprising the polyether polyol and the alkali metal ions through the first bed, wherein a relative weight ratio of polar organic solvent and water in the mixture comprising water and polar organic solvent is within a range of 1:1 to 10:1.

5. The process of claim 4, wherein the mixture comprising water and polar organic solvent is present in an amount of 10 to 40% by weight, based on the total combined weight of (i) the mixture comprising water and polar organic solvent and (ii) the mixture comprising the polyether polyol and the alkali metal ions.

6. The process of claim 1, wherein at least one of a container that includes the first bed and a container that includes the second bed is operated liquid-full throughout the process.

7. The process of claim 6, wherein the liquid level in the container operated liquid-full throughout the process is maintained at a level that is at least 95% of the total container height throughout the process.

8. The process of claim 1, wherein cation exchange resin that comprises sulfonic acid groups is present in an amount of no more than 1% by weight, based on the total weight of ion exchange resin used in each bed.

9. The process of claim 1, further comprising removing organic solvent and water from the purified polyether polyol.

10. The process of claim 9, wherein the removing organic solvent and water from the purified polyether polyol comprises at least atmospheric distillation and vacuum distillation.

11. The process of claim 9, wherein, after removal of organic solvent and water, the purified polyether polyol has a 2M2P (2-Methyl-2-Pentenal) content of no more than 5 ppm, based on total weight of the polyether polyol, as measured by Headspace Gas Chromatography and Mass Spectrometry (HS GC-MS).

12. The process of claim 9, wherein, after removal of organic solvent and water, the purified polyether polyol has a 2M2P (2-Methyl-2-Pentenal) content of no more than 1 ppm, based on total weight of the polyether polyol, as measured by Headspace Gas Chromatography and Mass Spectrometry (HS GC-MS).

13. The process of claim 12, wherein the purified polyether polyol has an acid number of no more than 0.1 mg KOH/g measured according to ASTM D7253-16.

14. The process of claim 12, wherein the purified polyether polyol has an alkalinity, determined by visual titration, of no more than 0.2 meq/kg.

15. A process for producing a polyether polyol, comprising: (a) adding an alkylene oxide onto an H-functional starter in the presence of an alkali metal catalyst to produce an alkali metal-containing crude polyol comprising a mixture comprising the polyether polyol and alkali metal ions; (b) passing the mixture through a first bed comprising a cation exchange resin comprising carboxylic acid and/or phosphonic acid groups to remove alkali metal ions from the mixture; and (c) passing the product of step (b) through a second bed comprising an anion exchange resin comprising quaternary ammonium groups and a cation exchange resin comprising carboxylic acid and/or phosphonic acid groups to thereby produce a purified polyether polyol, wherein the first bed and the second bed are each free of a cation exchange resin that comprises sulfonic acid groups.

16. The process of claim 13, wherein the polyether polyol has a hydroxyl number of no more than 56 mg KOH/gram, measured according to ASTM D4274-16.

17. The process of claim 15, wherein cation exchange resin that comprises sulfonic acid groups is present in an amount of no more than 1% by weight, based on the total weight of ion exchange resin used in each bed.

18. The process of claim 15, further comprising removing organic solvent and water from the purified polyether polyol.

19. The process of claim 18, wherein, after removal of organic solvent and water, the purified polyether polyol has a 2M2P (2-Methyl-2-Pentenal) content of no more than 5 ppm, based on total weight of the polyether polyol, as measured by Headspace Gas Chromatography and Mass Spectrometry (HS GC-MS).

20. The process of claim 18, wherein, after removal of organic solvent and water, the purified polyether polyol has a 2M2P (2-Methyl-2-Pentenal) content of no more than 1 ppm, based on total weight of the polyether polyol, as measured by Headspace Gas Chromatography and Mass Spectrometry (HS GC-MS).

\* \* \* \* \*